US010666081B2

(12) United States Patent
Irish et al.

(10) Patent No.: US 10,666,081 B2
(45) Date of Patent: May 26, 2020

(54) BATTERY MANAGEMENT SYSTEM (71) Applicant: Hyperdrive Innovation Limited, Sunderland Tyne and Wear (GB)

(72) Inventors: Stephen Irish, Sunderland Tyne and Wear (GB); Robin Shaw, Sunderland Tyne and Wear (GB)

(73) Assignee: Hyperdrive Innovation Limited, Sunderland (GB)

( * ) Notice: Subject to any disclaimer, the term of this patent is extended or adjusted under 35 U.S.C. 154(b) by 0 days.

(21) Appl. No.: 15/563,437

(22) PCT Filed: Dec. 30, 2016

(86) PCT No.: PCT/GB2016/054090
§ 371 (c)(1),
(2) Date: Sep. 29, 2017

(87) PCT Pub. No.: WO2017/115091
PCT Pub. Date: Jul. 6, 2017

(65) Prior Publication Data
US 2018/0316207 A1    Nov. 1, 2018

(30) Foreign Application Priority Data

Dec. 30, 2015   (GB) .................................. 1523105.3
Jun. 22, 2016   (GB) .................................. 1610936.5

(51) Int. Cl.
*H02J 7/00*       (2006.01)
*H01M 10/44*    (2006.01)
(Continued)

(52) U.S. Cl.
CPC ......... *H02J 7/0091* (2013.01); *H01M 10/425* (2013.01); *H01M 10/443* (2013.01);
(Continued)

(58) Field of Classification Search
CPC ..................................................... H02J 7/0091
(Continued)

(56) References Cited

U.S. PATENT DOCUMENTS 6,850,153 B1    2/2005  Murakami et al.
8,538,614 B1    9/2013  Nam et al.
(Continued)

FOREIGN PATENT DOCUMENTS

CN     103312010 A    9/2013
CN     105162215 A    12/2015
(Continued)

OTHER PUBLICATIONS

Examination Report for Application No. GB1523114.5, dated Jan. 16, 2018.
(Continued)

*Primary Examiner* — Edward Tso
*Assistant Examiner* — Ahmed H Omar (57) ABSTRACT

A battery management system for use in charging a rechargeable battery is disclosed. The battery management system comprises a controller and a temperature sensor, wherein the temperature sensor is configured to provide a temperature signal based on a temperature of the rechargeable battery, and wherein the controller is configured to control a charging current for charging the rechargeable battery based on the temperature signal. In response to the temperature signal indicating that the temperature exceeds a first threshold temperature signal value the charging current is tapered down as a function of increasing temperature.

15 Claims, 6 Drawing Sheets

(51) Int. Cl.
*H01M 10/42* (2006.01)
*H01M 10/48* (2006.01)

(52) U.S. Cl.
CPC ......... *H01M 10/48* (2013.01); *H01M 10/486* (2013.01); *H02J 7/0014* (2013.01); *H02J 7/0016* (2013.01); *H02J 7/0029* (2013.01); *H01M 2010/4271* (2013.01); *H01M 2220/20* (2013.01); *H02J 7/00304* (2020.01)

(58) Field of Classification Search
USPC ....................................................... 320/104
See application file for complete search history.

(56) References Cited

U.S. PATENT DOCUMENTS

| | | |
|---|---|---|
| 2008/0086247 A1 | 4/2008 | Gu et al. |
| 2008/0218122 A1 | 9/2008 | Takano et al. |
| 2009/0140694 A1 | 6/2009 | Zeng |
| 2010/0253285 A1 | 10/2010 | Takahashi et al. |
| 2013/0062966 A1 | 3/2013 | Verghese et al. |
| 2014/0210415 A1* | 7/2014 | Ohmori ................ H01M 10/44 320/118 |
| 2014/0222359 A1 | 8/2014 | Ko et al. |
| 2015/0054462 A1 | 2/2015 | Weidinger |
| 2015/0097525 A1 | 4/2015 | DeDona et al. |
| 2015/0115890 A1* | 4/2015 | Dickinson ............ H01M 2/1077 320/109 |
| 2015/0221993 A1 | 8/2015 | Wang et al. |
| 2015/0244192 A1 | 8/2015 | Dauchy et al. |
| 2015/0311734 A1 | 10/2015 | Kadie et al. |

FOREIGN PATENT DOCUMENTS

| | | |
|---|---|---|
| EP | 1710889 A2 | 10/2006 |
| EP | 1848088 A1 | 10/2007 |
| EP | 2131470 A2 | 12/2009 |
| EP | 2584666 A1 | 4/2013 |
| EP | 2690744 A2 | 1/2014 |
| EP | 2787594 A2 | 10/2014 |
| EP | 2866294 A1 | 4/2015 |
| JP | H09219901 A | 8/1997 |
| WO | 9310589 A1 | 5/1993 |
| WO | 9617397 A1 | 6/1996 |
| WO | 2011003513 A1 | 1/2011 |
| WO | 2012020306 A1 | 2/2012 |
| WO | 2012030455 A2 | 3/2012 |

OTHER PUBLICATIONS

Combined Search and Examination Report for GB Application No. 1523113.7 dated, Jun. 24, 2016.
International Search Report and Written Opinion for PCT/GB2016/054090, dated Apr. 26, 2017.
Search Report for GB Application No. 1523111.1, dated Jan. 14, 2016.
Combined Search and Examination Report for GB Application No. 1523114.5, dated Jun. 23, 2016.

* cited by examiner

BATTERY MANAGEMENT SYSTEM

FIELD OF THE INVENTION

The present disclosure relates to battery management systems, for example battery management systems for rechargeable batteries.

BACKGROUND

Rechargeable batteries are commonly used in many technologies, for example in electric or hybrid vehicles for use both on-highway and off-highway. For example, rechargeable batteries are frequently used in automotive applications (on highway), offshore applications (off highway), in a warehouse environment (for example for use with mechanical handling equipment such as fork-lift trucks and autonomous guided vehicles, for example as described in WO 98/49075—off highway) as well as in energy storage applications (both commercial and domestic—also off highway).

In order to monitor and control the performance of rechargeable batteries in such applications, a battery management system (BMS) may be used.

As described in WO 2015/104263, which relates to a storage system employing the use of battery-powered autonomous guided vehicles, or robots, there is undesired robot standstill when the batteries are being charged. This reduces the operational cycle of the storage system as a whole, for example to typically 16 hours a day to accommodate 8 hours of charging time. To address this problem, WO 2015/104263 describes a battery comprising a receiving means enabling releasable connection to a corresponding charge station. WO 2015/104263 describes interchanging a first battery with a second battery, so that the robot can remain in use while the first battery is being charged by a charging station.

SUMMARY OF THE INVENTION

Aspects of the invention are as set out in the independent claims and optional features are set out in the dependent claims. Aspects of the invention may be provided in conjunction with each other and features of one aspect may be applied to other aspects.

DRAWINGS

Embodiments of the disclosure will now be described, by way of example only, with reference to the accompanying drawings, in which.

SPECIFIC DESCRIPTION

Figure 1:
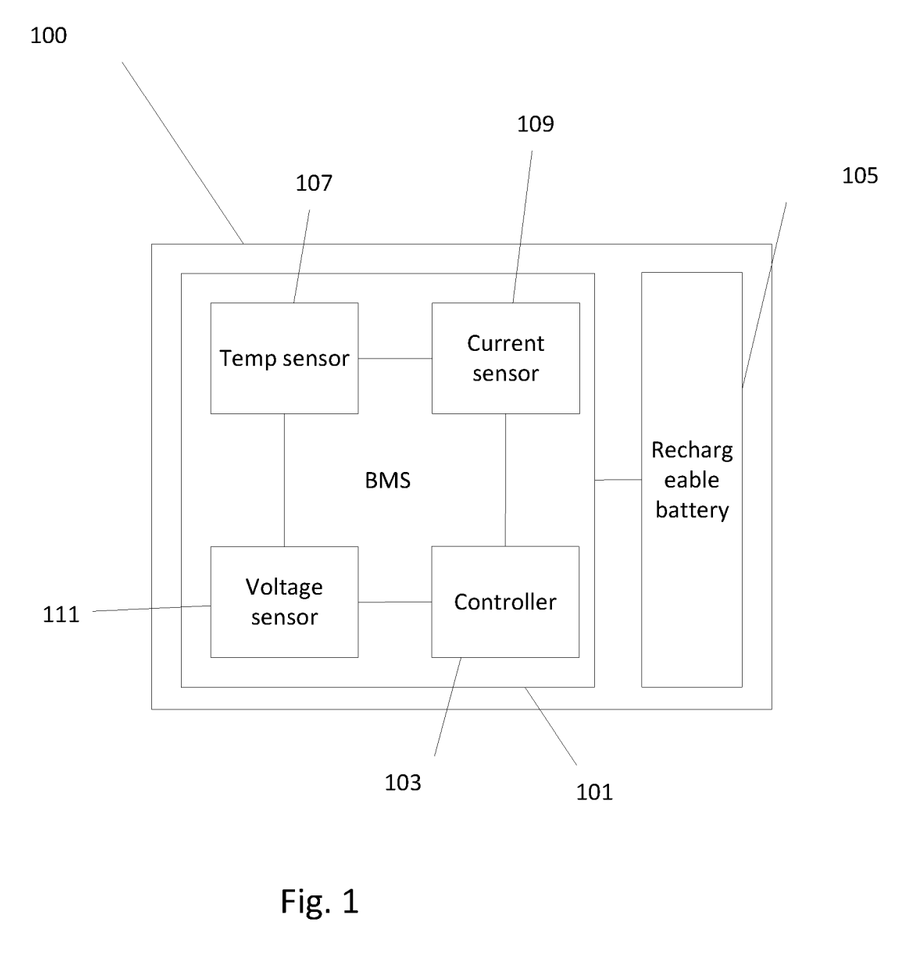
FIG. 1 shows a schematic view of a rechargeable battery pack comprising an example battery management system.

Embodiments of the claims relate to a battery management system (BMS), for example for use in charging a rechargeable battery. As shown in FIG. 1, a rechargeable battery pack 100 comprises a BMS 101 and a rechargeable battery 105. The BMS 101 comprises a controller 103 and a temperature sensor 105 that provides a temperature signal based on the temperature of the rechargeable battery 103. The rechargeable battery pack 100 can be coupled to a power source such as a charging station to charge the rechargeable battery 105 via the BMS 101. The controller 103 of the BMS is configured to control a charging current provided by the power source to the rechargeable battery 105 based on the temperature signal provided by the temperature sensor 107. In response to the temperature signal indicating that the temperature exceeds a first threshold temperature signal value, the charging current is tapered down as a function of increasing temperature.

For example, the rechargeable battery 105 may have a nominal operating range, such as between 10-40° C. If the temperature sensor 107 provides a temperature signal indicating that the temperature of the rechargeable battery 105 reaches a threshold temperature, for example 42° C., the controller 103 may throttle the current supplied to the rechargeable battery 105 in an effort to stop the temperature of the battery 105 from continuing to rise. If the temperature signal indicates that the temperature of the rechargeable battery 105 is higher, for example 43 or 44° C., the controller 103 may throttle the current further, so that less current is supplied to the battery 105 than at, for example, 42° C. If the temperature signal indicates that the temperature of the rechargeable battery 105 is even higher, so that it reaches a second threshold temperature, for example 45° C., the controller may throttle the current altogether so that no current is supplied to the rechargeable battery 105, in an effort to ensure the temperature of the rechargeable battery 105 does not exceed the second threshold temperature and thereby prevent damage being caused to the rechargeable battery 105.

Because the current supplied to the battery 105 can be controlled as a function of temperature, the battery 105 can be charged more quickly without damaging the battery 105. Because the temperature of the rechargeable battery 105 is used, performance of the battery 105 can be maintained even if the field of application is in particularly hot or cold environments, such as for vehicles designed for use in the Antarctic or in the desert.

It will be appreciated from the discussion above that the embodiments shown in the Figures are merely exemplary, and include features which may be generalised, removed or replaced as described herein and as set out in the claims. The actual example actually shown in FIG. 1 comprises a battery pack 100 comprising a BMS 101 coupled to a rechargeable battery 105. The rechargeable battery comprises at least one $LiFePO_4$ cell. The BMS 101 comprises a controller 103, a current sensor 109, a temperature sensor 107 and a voltage sensor 111 all coupled in series to the controller 103.

The controller 103, voltage sensor 111 and current sensor 109 in the example are arranged on a printed circuit board. The temperature sensor 107 is coupled to the positive end of the stack of cells. Due to the peltier effect, the positive end of the stack will become hotter than the negative end in use, and so the temperature sensor is coupled to the hottest cell of the stack.

The controller 103 further comprises a data store comprising a stored relationship. In the example shown in FIG. 1, the stored relationship comprises a lookup table providing set current values as a function of temperature.

The BMS 101 is couplable to a source of charging current, for example a charging point 300. The controller 103 is configured to send a request to the charging point 300 for a charging current to supply the battery 105. The temperature sensor 107 is configured to provide a temperature signal based on a temperature of the rechargeable battery 105. In the example shown in FIG. 1, the current sensor 109 monitors the charging current to the rechargeable battery 105 and provides a current signal to the controller 103. The controller 103 is configured to control (for example, throttle) the charging current for charging the rechargeable battery 105 based on the temperature signal. For example, the controller comprises a current restrictor for controlling the charging current to the battery 105, for example a transistor such as a field effect transistor.

In the example shown in FIG. 1, the controller 103 is configured to control (or throttle) the flow of charging current to the battery 105 during charging of the battery 105. In the example shown in FIG. 1, the controller 103 is configured to control the charging current based on the temperature signal and the current signal, although in other examples the controller 103 may control the charging current based on just the temperature signal. Tapering of the current based on temperature is according to the stored relationship, for example a lookup table, and the controller 103 is configured to control the charging current based on the stored relationship.

In operation, the battery pack 100 is coupled to a charging point 300. In response to the controller 103 sending a request to the charging point 300, charging of the battery 105 begins. The controller 103 of the BMS 101 of the battery pack 100 may send the current request in response to making a determination about whether charging of the battery 105 is required based on at least one parameter of the battery 105, for example based on the voltage of the battery 105.

During charging, the temperature sensor 107 monitors the temperature of the battery 105, and the current sensor 109 monitors the charging current to the battery 105. The temperature sensor 107 sends a temperature signal to the controller 103 and the current sensor 109 sends a current signal to the controller 103. In response to the temperature signal indicating that the temperature exceeds a first threshold temperature signal value, the controller 103 tapers down (or throttles) the charging current as a function of increasing temperature. The first threshold temperature may be 42° C. The tapering may be according to a linear relationship between current and temperature, for example.

In some examples, in response to the temperature signal indicating that the temperature exceeds a second threshold temperature, the controller 103 controls or throttles the charging current so that no charging current is supplied to the battery 105. The second threshold temperature may be 45° C.

In some examples, in response to the temperature signal indicating that the temperature is below a third threshold, the controller 103 is configured to taper the charging current down as a function of decreasing temperature. The third threshold temperature may be 5° C. The tapering may be according to a linear relationship between current and temperature, for example.

In response to the temperature signal indicating that the temperature is below a fourth threshold, the controller 103 may be configured to control or throttle the charging current so that no charging current is supplied to the battery 105. The fourth threshold temperature may be 0° C.

The controller 103 may be configured to control the flow of charging current to the battery 105 during charging of the battery 105 so that the temperature of the battery is within a selected range. For example, the selected range may have end-points that correspond to the second and fourth threshold temperatures described above.

Figure 2:
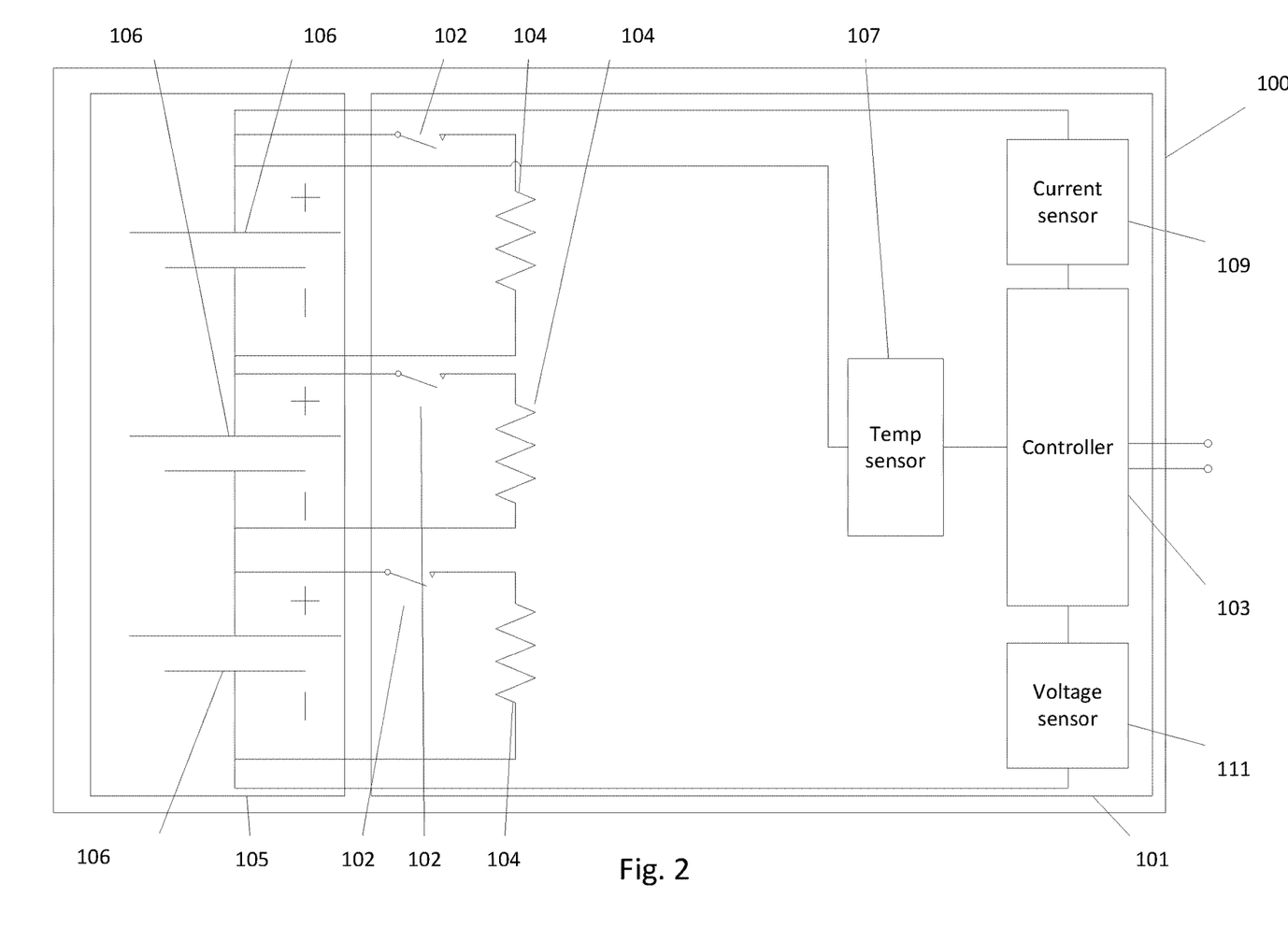
FIG. 2 shows a schematic view of the cells of a rechargeable battery in a rechargeable battery pack, such as the one shown in FIG. 1.

Other embodiments of the claims relate to a BMS, for example the BMS 101 shown in FIG. 2, that can operate in two modes. In the first mode a controller 103 controls a charging current for charging a rechargeable battery 105 based on a temperature signal received from a temperature sensor 107. The rechargeable battery 105 may comprise a plurality of cells 106, and in the second mode the controller 103 is configured to balance the cells 106 of the rechargeable battery 105 based on an indicated level of charge of each respective cell 106, for example based on a voltage signal provided by a voltage sensor 111. In this way, a rechargeable battery 105 comprising a plurality of cells 106 can be rapidly charged during the first mode, and then once the rechargeable battery 105 is charged to a certain level, for example a certain voltage level as indicated by the voltage sensor 111, the BMS 101 can then balance the cells 106 based on their respective levels of charge, for example so that all of the cells 106 are charged to the same level.

As noted above, it will be appreciated from the discussion above that the embodiments shown in the Figures are merely exemplary, and include features which may be generalised, removed or replaced as described herein and as set out in the claims. The actual example actually shown in FIG. 2 shows a battery pack 100 similar to the battery pack shown in FIG. 1. The battery pack 100 shown in FIG. 2 comprises a BMS 101 coupled to a rechargeable battery 105. The BMS 101 comprises a controller 103, a voltage sensor 111 and a current sensor 109 arranged in series and coupled to the battery 105, and a temperature sensor 107 coupled to the battery 105 and the controller 103.

As shown in FIG. 2, the rechargeable battery 105 comprises three cells 106 arranged in a stack connected in series. Each cell 106 of the battery 105 has a corresponding resistor 104 arranged in parallel with that cell 106. A switch 102 is coupled in series between each resistor 104 and cell 106.

The controller 103, voltage sensor 111, current sensor 109 and temperature sensor 106 operate in much the same way as those described above in relation to FIG. 1. As with the battery pack 100 shown in FIG. 1, the controller 103 is configured to send a request to a charging point for a charging current to supply the battery 105. The temperature sensor 107 is configured to provide a temperature signal based on a temperature of the rechargeable battery 105. The voltage sensor 111 is operable to provide a voltage signal to act as a charge indicator to provide the indication of the level of charge of the cells 106 of the battery 105.

The controller is configured to operate in at least two modes. In the first mode the controller 103 controls a charging current for charging the battery 105 based on the temperature signal from the temperature sensor 107, for example in a manner described above in relation to FIG. 1. In the second mode the controller 103 is configured to balance the cells 106 of the battery 105 based on the indicated level of charge of each respective cell 106.

To balance the cells 106 of the battery 105, the controller 103 is configured to control the charging current to each cell 106 of the battery 105. To do this, the controller 103 is operable to control each switch 102 to control the flow of current to each resistor 104 and hence the flow of charging current to each cell 106.

The controller 103 may be configured to balance the cells 106 of the battery 105 in the first and second modes during charging of the battery 105 and in a third mode during discharging of the battery 105. The controller 103 may be configured to control the current drawn from each cell 106 during the third mode during discharge.

As with the battery pack 100 of FIG. 1, in operation, the battery pack 100 is coupled to a charging point. In response to the controller 103 sending a request to the charging point, charging of the battery 105 begins. During charging, the temperature sensor 107 monitors the temperature of the battery 105, and sends a temperature signal to the controller 103. The current sensor 109 monitors the charging current to the battery 105 and sends a current signal to the controller 103.

In the first mode, in response to the temperature signal indicating that the temperature exceeds a first threshold temperature, the controller tapers (or throttles) the charging current down as a function of increasing temperature.

The BMS 101 operates in the second mode when a selected threshold is reached. For example, the BMS 101 operates in the second mode when a selected voltage threshold is reach, as indicated by a voltage signal provided by the voltage sensor 111. Because the voltage signal may represent a level of charge of the battery 105, as described above, the BMS 101 may operate in the second mode once the level of charge of the battery 105 has reached a certain level. The voltage threshold may be, for example, 3.1 V, for example, 3.3 V, for example 3.6 V.

In the second mode, the controller 103 balances the cells 106 based on an indicated level of charge of each respective cell 106, for example based on the voltage of each respective cell 106. To balance the cells 106, the controller 103 controls the corresponding switch 102 for each respective cell 106. By opening and/or closing each switch 102, the controller 103 controls the amount of current flowing through each corresponding resistor 104. Because each resistor 104 is arranged in parallel with each cell 106, controlling the current to each resistor 104 also controls the current to each cell 106.

The controller 103 may operate in the second mode during charging in response to the charging current being supplied to the battery 105 exceeding a selected charging current threshold, for example 0.5 A. The controller 103 may operate in the second mode during charging in response to the charging voltage being supplied to the battery 105 exceeding a selected charging voltage threshold, for example 3.0V.

In the second mode, the controller 103 may rank each of the cells 106 of the battery 105 in voltage order, and control the charging current to each of the cells 106 of the battery 105 based on the ranking. The controller 103 may also control the charging current to each of the cells 106 based on an offset between the voltage of the highest and lowest cells 106. For example, the controller may control the charging current to each of a selected number of cells 106, for example the top cell 106, the top 2 cells 106, the top 3 cells 106 or the top 4 cells 106, until the offset between each of those cells 106 with the bottom cell 106 reaches a threshold value, such as 0.002V.

Once charging is complete, and the battery is used for discharge (for example by coupling it to a load), the controller 103 may operate in the third mode. In the third mode, the controller 103 may only balance the cells 106 of the battery 105 during discharge in response to the voltage of a cell 106 of the battery 105 meeting and/or exceeding a selected voltage threshold, for example greater than or equal to 3.6 V, greater than or equal to 3.9 V, greater than or equal to 4.2 V. By only balancing the cells 106 when their voltage meets and/or exceeds a selected voltage threshold, cells 106 are only balanced when they have a sufficient level of charge. The inventors have surprisingly found that balancing the cells 106 when their level of charge is too low is inefficient.

In the first mode, the controller 103 may function in a similar way to the BMS of FIG. 1. For example, the controller 103 may be configured to control the flow of charging current to the battery 105 during charging of the battery 105 so that the temperature of the battery is within a selected range. For example, the selected range may correspond to the second and fourth threshold temperatures.

In some examples the battery 105 comprises two stacks of cells 106 arranged in series, and two temperature sensors 107, each temperature sensor 107 arranged to provide a temperature signal based on a temperature of each stack of cells 106. The controller 103 may be configured to control the charging current to the battery 105 based on the respective highest or lowest monitored temperature of the two temperature sensors 107.

Figure 3:
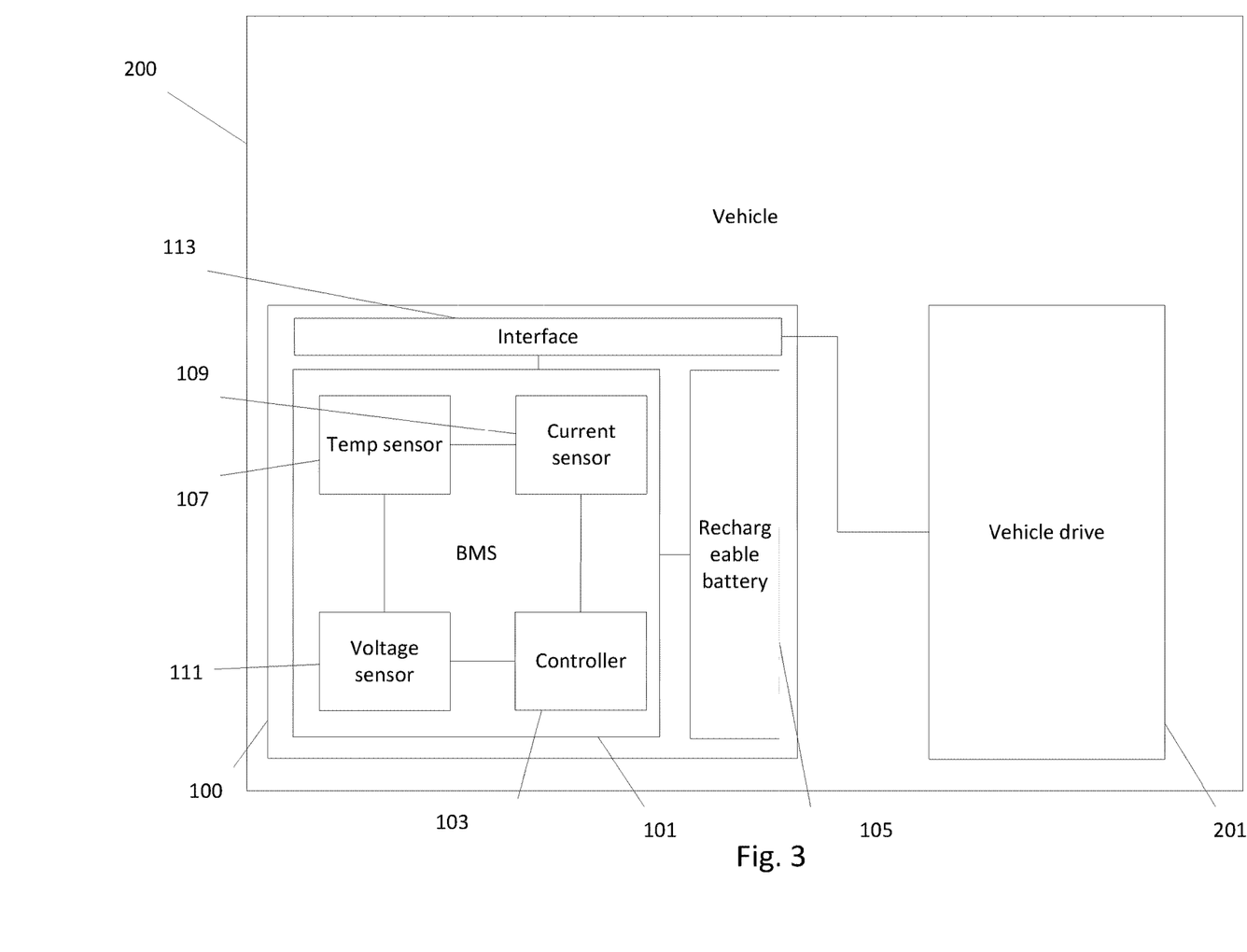
FIG. 3 shows an example electric vehicle comprising a rechargeable battery pack, such as the one shown in FIG. 1.

Other embodiments of the claims, for example as shown in FIG. 3, relate to a BMS 101 for an electric or hybrid vehicle 200 that may prevent the vehicle 200 from accidentally driving away whilst being charged. The BMS shown in FIG. 3 comprises a controller 103 configured to communicate with a vehicle drive 201, for example via an Interface 113. The BMS 101 further comprises a charging detector, for example a current sensor 109, which detects whether a rechargeable battery 105 is being charged. The controller 103 is configured to send a signal to the vehicle drive 201 via the interface 113 to inhibit operation of the vehicle drive 201 in response to the charging detector detecting that the rechargeable battery 105 is being charged.

FIG. 3 shows a vehicle 200 comprising a battery pack 100, such as the battery pack 100 shown in FIG. 1. The battery pack 100 comprises an interface 113. The battery pack 100 is coupled to a vehicle drive 201 via the interface 113. The vehicle drive 201 may be an electric motor, for example.

As noted above, it will be appreciated from the discussion above that the embodiments shown in the Figures are merely exemplary, and include features which may be generalised, removed or replaced as described herein and as set out in the claims. The actual example actually shown in FIG. 3 shows a battery pack 100 comprising a BMS 101 coupled to the interface 113 and a rechargeable battery 105. The interface 113 may be a controller area network (CAN) interface. The BMS 101 comprises a controller 103, a charging detector, which in the example shown is a current sensor 109, a temperature sensor 107 and a voltage sensor 111 all coupled to the controller 103.

The controller 103 is configured to communicate with the vehicle drive 201 via the interface 113. The current sensor 109 is configured to detect whether the battery 105 is being charged.

The controller 103 is configured to send a signal to inhibit operation of the vehicle drive 201 in response to the current sensor 109 detecting that the battery 105 is being charged. The controller 103 may be configured to communicate over a network, for example a CAN bus. The controller 103 may send the signal to inhibit operation of the vehicle drive 201 over the CAN bus. For example, the controller 103 may broadcast a charging advert over the CAN bus.

As with the battery pack 100 of FIGS. 1 and 2, in operation, the battery pack 100 is coupled to a charging point. In response to the controller 103 sending a request to the charging point, charging of the battery 105 begins. During charging, the current sensor 109 monitors the charging current to the battery 105. The current sensor 109 sends a current signal to the controller 103. In response to the controller 103 receiving the current signal, which indicates that charging current is supplied to the battery 105, the controller 103 sends a signal to via the interface 113 to inhibit operation of the vehicle drive 201.

In the example shown in FIG. 3, the BMS 101 comprises an optional voltage sensor 111 which acts as a charge indicator. The voltage sensor 111 is configured to provide an indication of the level of charge of the battery 105 to the controller. For example, the voltage sensor 111 sends a voltage signal to the controller 103.

In response to the voltage sensor 111 sending a voltage signal to the controller 103 indicating that the level of charge is below a charge threshold, the controller 103 is configured to send a charging advert, for example over a network such as a CAN bus. The charging advert may be a repeating advert or a single message. It may be broadcast over a network or sent to specific devices coupled to the controller 103. Where the charging advert is a repeating advert, in response to the voltage signal indicating that the level of charge is above a charge threshold, the controller 103 may no longer sends a charging advert over the network. The charge threshold may be, for example, 3.6 V.

In examples where the controller 103 is configured to communicate over a network, the controller 103 may send a repeating current request message to a charging point over the network. In response to the controller 103 receiving a response to the current request message, the controller 103 may send a signal to inhibit operation of the vehicle drive 201. The controller 103 may be configured to repeatedly poll the network for a response to the broadcasted current request in a time interval following the broadcasted current request. In response to an instruction received over the network, the controller 103 may be configured to send a signal to the vehicle drive 201 overriding the signal to inhibit operation of the vehicle drive 201. In some examples, the controller 103 is configured to inhibit operation of the vehicle drive by sending a repeating charging advert to the vehicle drive 201 over the network.

Figure 4:
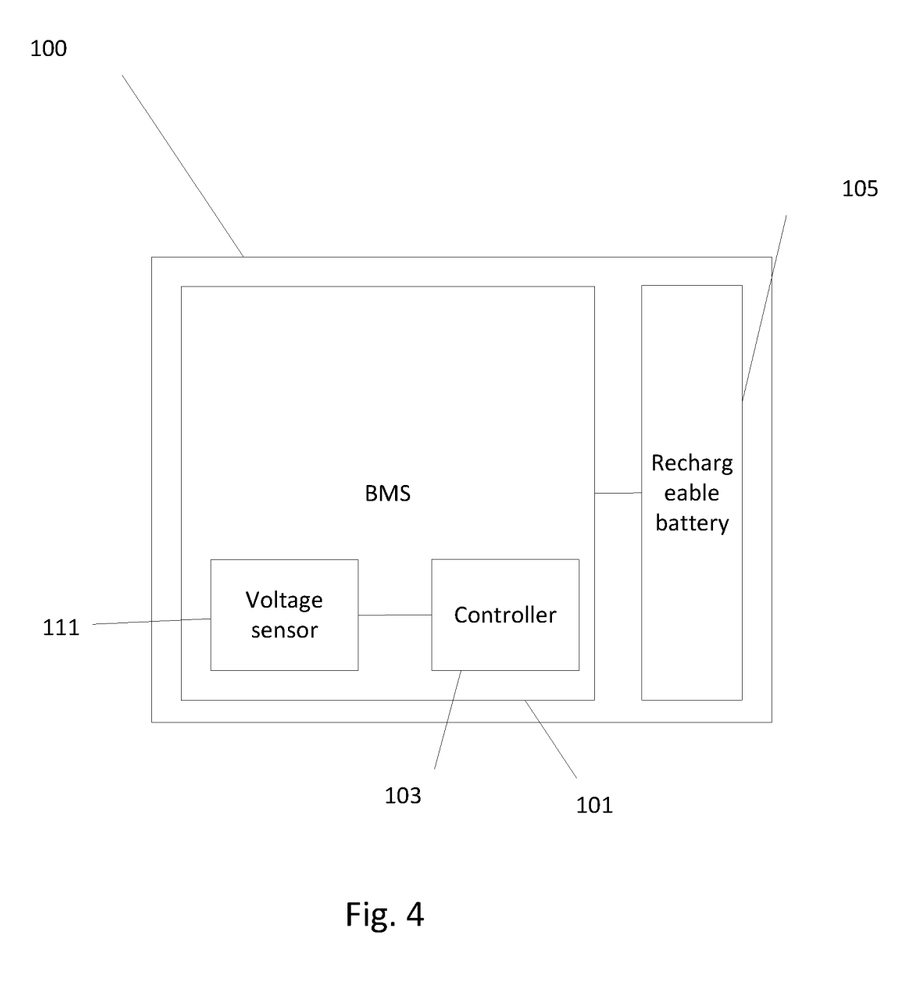
FIG. 4 shows another example battery pack.

Other embodiments of the claims, for example as shown in FIG. 4, relate to a BMS 101 comprising a controller 103 and a voltage sensor 111 that can disconnect the charging current to a battery 105 in response to a measured battery voltage exceeding a voltage threshold. For example, the BMS 101 may be configured to disconnect the charging current in response to a voltage spike, for example due to a short-circuit or arcing. In this way, the BMS 101 may act in a manner similar to a fuse.

As noted above, it will be appreciated from the discussion above that the embodiments shown in the Figures are merely exemplary, and include features which may be generalised, removed or replaced as described herein and as set out in the claims. The actual example actually shown in FIG. 4 shows a battery pack 100, again similar to the battery pack of FIG. 1. The battery pack 100 shown in FIG. 4 comprises a rechargeable battery 105 coupled to a BMS 101. The BMS 101 comprises a controller 103 and a voltage sensor 111.

The voltage sensor 111 is configured to measure a voltage of the battery 105 and send a voltage signal to the controller 103. The controller 103 is configured to receive a voltage signal from the voltage sensor 111. The controller 103 is configured to disconnect a charging current to the battery 105 in response to the voltage signal (indicative of the measured battery voltage) exceeding a voltage threshold.

As with the battery pack 100 of FIGS. 1, 2 and 3, in operation, the battery pack 100 is coupled to a charging point. In response to the controller 103 sending a request to the charging point, charging of the battery 105 begins.

The voltage sensor 111 monitors the voltage of the battery 105 at all times, but in some examples may only monitor the voltage of the battery 105 during charging of the battery 105. The voltage sensor 111 sends a voltage signal to the controller 103. The controller 103 may control when the voltage sensor 111 is monitoring the voltage of the battery 105.

In response to the controller 103 receiving a voltage signal exceeding a voltage threshold, the controller 103 disconnects the charging current to the battery 105. For example, the BMS 101 may comprise a field effect transistor, and the controller 103 may control the field effect transistor to disconnect or throttle the charging current.

The voltage threshold is selected so that it is larger than a nominal operating voltage range of the battery 105. For example, the voltage threshold may be greater than 4 V, greater than 8 V, greater than 10 V, greater than 15 V, greater than 20 V. The voltage threshold may be selected to correspond to a voltage spike caused by arcing, for example due to arcing between charging contacts on the battery pack 100 and a charging point.

In some examples, the battery 105 comprises a plurality of cells 106. Each cell 106 may comprise a voltage sensor 111 that sends a respective voltage signal to the controller 103. The controller 103 may be configured to disconnect the charging current to the battery 105 in response to at least one of the voltage signals exceeding the threshold value.

Figure 5:
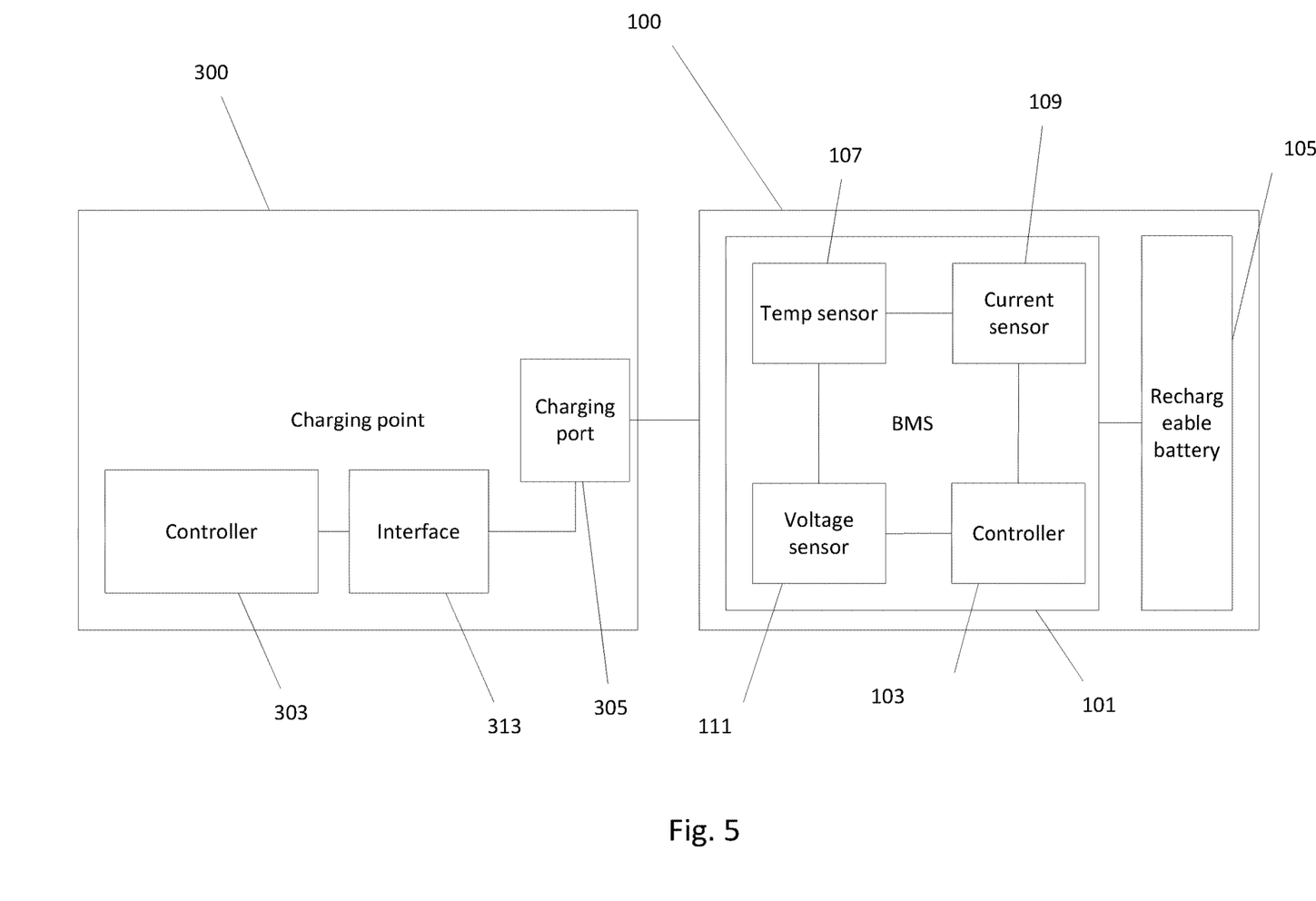
FIG. 5 shows an example charging point for charging a rechargeable battery pack, such as the battery pack shown in FIG. 1, comprising a battery management system.

Other embodiments of the claims, for example as shown in FIG. 5, relate to a charging point 300 for a rechargeable battery 105 that can control charging of the battery 105 based on a parameter of the battery 105, such as temperature or voltage. For example, the charging point 300 comprises a charging port 305 for electrically coupling with the rechargeable battery 105 of the rechargeable battery pack 100. The charging point 300 also comprises a controller 303, and an interface 313 for receiving at least one parameter of the rechargeable battery 105. The at least one parameter may comprise at least one of a temperature of the battery 105, for example as measured using a temperature sensor 107, and a voltage of the battery 105, for example as measured using a voltage sensor 111. The controller 303 of the charging point 303 is configured to control the charging current to the battery 105 during charging of the battery 105 based on the at least one parameter.

As noted above, it will be appreciated from the discussion above that the embodiments shown in the Figures are merely exemplary, and include features which may be generalised, removed or replaced as described herein and as set out in the claims. The actual example actually shown in FIG. 5 shows a charging point 300 for charging a rechargeable battery pack 100, such as the rechargeable battery pack 100 of FIG. 1, 2 or 4. The charging point 300 shown in FIG. 5 comprises a charging port 305 coupled to a controller 303 via an interface 313.

As described above in relation to FIGS. 1 and 2, the battery pack 100 comprises a BMS 101 coupled to a rechargeable battery 105. The BMS 101 comprises a controller 103, an optional current sensor 109, a temperature sensor 107 and a voltage sensor 111 all coupled to the controller 103. In some examples the BMS 101 may comprise only one of, or any combination of, the current sensor 109, the temperature sensor 107 and the voltage sensor 111.

The controller 103 of the battery pack 100 is configured to send a request to the charging point 300 for a charging current to supply the battery 105. The temperature sensor 107 is configured to provide a temperature signal based on a temperature of the rechargeable battery 105. The current sensor 109 monitors the charging current to the rechargeable battery 105 and is configured to provide a current signal to the controller 103. The voltage sensor 111 monitors the voltage of the rechargeable battery 105 and is configured to provide a voltage signal to the controller 103.

The charging port 305 is configured to electrically couple with the rechargeable battery 105 of the rechargeable battery pack 100. The controller 303 is configured to receive at least one parameter of the rechargeable battery 105 of the battery pack 100 via the interface 313. The at least one parameter comprises at least one of a temperature of the battery received as a temperature signal from the temperature sensor 107 and a voltage of the battery 105 received as a voltage signal from the voltage sensor 111, via the controller 103 of the BMS 101.

The controller 303 of the charging point 300 is configured to control the charging current to the battery 105 during charging of the battery 105 based on the at least one parameter.

The controller 303 is configured to communicate over a network, for example a CAN bus, via the interface 313 with the controller 103 of the BMS 101 of the battery pack 100. The controller 303 is configured to communicate with a rechargeable battery pack 100 via the interface 313 and the charging port 305. The controller 303 is configured to control the charging current to the battery 105 based on the at least one other parameter being received in a message over the network.

In use, the rechargeable battery pack 100 is coupled to the charging point 300 via the charging port 305. Charging can begin in a number of different ways. For example, the controller 103 of the BMS 101 of the battery pack 100 may send a current request to the charging point 300. In response to receiving the current request, the controller 303 of the charging point 300 may begin charging the battery 105 of the battery pack 100. The controller 103 of the BMS 101 of the battery pack 100 may send the current request in response to making a determination about whether charging of the battery 105 is required based on the at least one parameter.

In other examples, the controller 303 may send a signal or message to the controller 103 of the BMS 101 of the battery pack 100, requesting information regarding the at least one other parameter. In response, the controller 103 of the BMS 101 of the battery pack 100 may send a signal or message comprising information relating to the at least one parameter to the controller 303 of the charging point 300. In response to receiving this information, the controller 303 of the charging point 300 may make a determination about whether to start charging of the battery 105 of the battery pack 100.

Once charging begins, the controller 303 of the charging point 300 controls the charging current to the battery 105 during charging of the battery 105 based on the at least one parameter. For example, in response to a voltage signal indicating that the level of charge of the battery 105 has reached a charge threshold, the controller 303 may taper or cut off the charging current supplied to the battery 105. As described in relation to FIG. 3, the charge threshold may be, for example, 3.6 V.

As described above in relation to FIGS. 1 and 2, the controller 103 may be configured to control (or throttle) the charging current for charging the rechargeable battery 105 based on the temperature signal. For example, the controller comprises a current restrictor for controlling the charging current to the battery 105, for example a field effect transistor.

The at least one parameter may comprise an instruction to send current. For example, the charging point 300 may be configured to commence the charging current to the battery 105 and therefore start charging upon receiving a first message via the interface 313, and to inhibit the charging current to the battery 105, and therefore stop charging, upon receiving a second message via the interface 313.

The controller 303 of the charging point 300 may be configured to repeatedly send an advertisement message via the interface 313. The charging point 300 may be configured to control the charging current to the battery 105 upon acknowledgement of receipt of the advertisement message.

In the example described above, the controller 303 of the charging point 300 is configured to communicate with a rechargeable battery pack 100 via the interface 313 and the charging port 305. In other examples the controller 303 of the charging point 300 is configured to communicate with a rechargeable battery pack 100 via the interface 313 but not via the charging port 305. For example, the charging point 300 may be configured to communicate with a rechargeable battery pack 100 via a network port, such as a CAN port that is operable to couple with the rechargeable battery pack 100.

Figure 6:
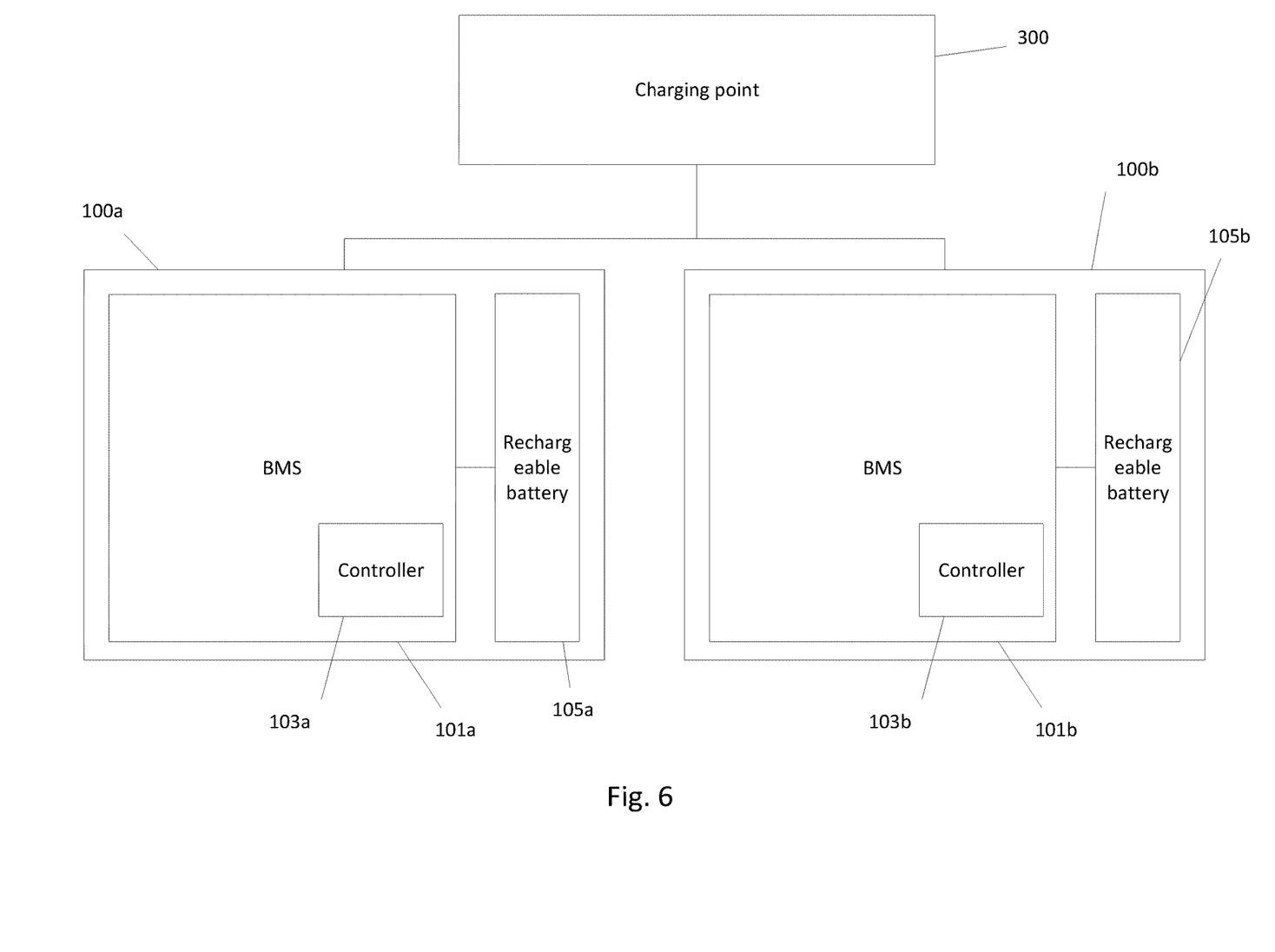
FIG. 6 shows an example battery management system for use in charging a plurality of battery packs, such as the battery pack shown in FIG. 1.

Other embodiments of the claims, for example as shown in FIG. 6, relate to a BMS 101 that can be used in charging a plurality of rechargeable battery packs 100, for example so that the battery packs 100 are charged to the same level. Each battery pack 100 comprises a rechargeable battery 105 and a BMS 101 comprising a controller 103. Each of the battery packs 100 are coupled to a charging point 300, either in series or in parallel. The controller 103 of one battery pack 100 is configured to communicate with the controller 103 of another battery pack 100, and upon communicating with each other each battery pack 100 is configured to designate itself as either a "master" or "slave". The controller 103 of the master battery pack 100 is configured to receive information regarding parameters regarding the battery 105 of the slave battery pack 100 and control a charging current from the charging point 300 to the batteries 105, of either the slave or both the master and the slave battery packs 100, based on the information received from the slave battery pack 100.

As noted above, it will be appreciated from the discussion above that the embodiments shown in the Figures are merely exemplary, and include features which may be generalised, removed or replaced as described herein and as set out in the claims. The actual example actually shown in FIG. 6 shows an example BMS 101*a* for charging a plurality of batteries 105*a*, 105*b*.

FIG. 6 shows two battery packs 100*a* and 100*b*. The two battery packs 100*a*, 100*b* shown in FIG. 6 are coupled to each other and to a charging point 300, for example the charging point of FIG. 5 described above.

The first battery pack 100*a* comprises a BMS 101*a* coupled to a rechargeable battery 105*a*. The BMS 101*a* comprises a controller 103*a*. The second battery pack 100*b* also comprises a BMS 101*b* coupled to a rechargeable battery 105*b*. The BMS 101*b* also comprises a controller 103*b*.

The controller 103*a* of the first BMS 101*a* is configured to communicate with the controller 103*b* of the second BMS 101*b*, for example via an optional interface (not shown). Upon communication with the second BMS 101*b*, the controller 103*a* of the first BMS 101*a* is configured to designate itself as a master controller 103*a* and designate the other controller as a slave controller 103*b*.

The master controller 103*a* is configured to receive information regarding parameters of the second battery 105*b* of the plurality of batteries from the slave controller 103*b*. The parameters of the battery 105 may include at least one of: pack temperature, pack voltage, charging current flow to pack, number of cells per pack, charging current flow to each cell and voltage of each cell.

The master controller 103a is configured to control a charging current received from the barging point 300 to the plurality of batteries 105a, 105b based on the received information and based on information regarding parameters of the first battery 105a.

As with the battery pack 100 of FIGS. 1 and 2, in operation, the battery packs 100a, 100b are coupled to the charging point 300. The master controller 103a may make a determination when the plurality of batteries 105a, 105b need charging based on the received information regarding the first battery 105a, the second battery 105b or a combination of both.

In response to the master controller 103a sending a request to the charging point, charging of the batteries 105a, 105b begins. The master controller 103a controls the current supplied to both batteries 105a, 105b based on the received information. For example, the master controller 103a may control current supplied to the batteries 105a, 105b based on the highest or lowest temperature of the plurality of batteries.

The master controller 103a may control the current supplied to the batteries 105a, 105b in a number of different ways. For example, in some examples the master controller 103a may directly control the flow of current from the charging point 300 to the second battery pack 100b. In other examples, the master controller 103a may be configured to send instructions to the slave controller 103b. The master controller 103a may send a signal to the slave controller 103b telling the slave controller 103b what current to request from the charging point 300.

The master controller 103a may control the current supplied to the batteries 105a, 105b so that both batteries 105a, 105b are charged to the same level. This may be useful when one battery charges more quickly than the other. For example, the master controller 103a may be configured to supply current to both batteries 105a, 105b at an equal rate until one of the batteries 105a, 105b reaches a threshold value, such as a selected voltage threshold such as 3.1 V, 3.3 V, 3.6 V. Once one of the batteries reaches the selected voltage threshold, the master controller 103a may be configured to supply current only to the other battery until both batteries are at the same voltage level (for example so that both batteries are charged to the same level).

It will be understood in the context of the present disclosure that the BMS 101 or battery pack 100 described above in relation to a particular Figure may comprise features that may be used in the context of another example.

For example, the battery pack 100 of any of FIGS. 2, 3, 4, 5 and 6 may be configured to control charging of the battery 105 based on a temperature of the battery 105, for example as described above in relation to FIG. 1. For example, the BMS 101 of the battery pack 100 may comprise a current sensor 109 and a temperature sensor 107 coupled to the controller 103. The temperature sensor 107 may be configured to provide a temperature signal based on a temperature of the rechargeable battery 105, and the current sensor monitors the charging current to the rechargeable battery 105 and provides a current signal to the controller 103. The controller 103 may be configured to control the charging current based on the temperature signal and the current signal.

The battery pack 100 of any of FIGS. 1, 3, 4, 5 and 6 may be configured to operate in two modes, as described above in relation to FIG. 2. For example, the BMS 101 of the battery pack 100 comprises a controller 103, a voltage sensor 111 and a current sensor 109 arranged in series and coupled to the battery 105, and a temperature sensor 107 coupled to the battery 105 and the controller 103. The temperature sensor 107 may be configured to provide a temperature signal based on a temperature of the rechargeable battery 105. The voltage sensor 111 may be operable to provide a voltage signal to act as a charge indicator to provide the indication of the level of charge of the cells 106 of the battery 105. The controller 103 may be configured to operate in at least two modes. In the first mode the controller 103 controls a charging current for charging the battery 105 based on the temperature signal from the temperature sensor 107, for example in a manner described above in relation to FIG. 1. In the second mode the controller 103 is configured to balance the cells 106 of the battery 105 based on the indicated level of charge of each respective cell 106.

The battery pack 100 of any of FIGS. 1, 2, 4, 5 and 6 may be configured to communicate with a vehicle drive 201 as described above in relation to FIG. 1. For example, the battery pack 100 comprises an interface 113. The battery pack 100 is coupled to a vehicle drive 201 via the interface 113. The controller 103 may be configured to communicate with the vehicle drive 201 via the interface 113. The current sensor 109 may be configured to detect whether the battery 105 is being charged. The controller 103 may be configured to send a signal to inhibit operation of the vehicle drive 201 in response to the current sensor 109 detecting that the battery 105 is being charged.

The battery pack 100 of any of FIGS. 1, 2, 3, 5 and 6 may be configured to disconnect a charging current to the battery 105 in response to a measured battery voltage exceeding a voltage threshold. For example, the BMS 101 of the battery pack 100 comprises a controller 103 and a voltage sensor 111. The voltage sensor 111 may be configured to measure a voltage of the battery 105 and send a voltage signal to the controller 103. The controller 103 may be configured to disconnect a charging current to the battery 105 in response to the voltage signal exceeding a voltage threshold.

The battery pack 100 of any of FIGS. 1, 2, 3, 4 and 6 may be configured to operate with a charging point 300 as described above in relation to FIG. 5. For example, the BMS 101 of the battery pack 100 may comprise at least one of, or any combination of, a current sensor 109, a temperature sensor 107 and a voltage sensor 111, arranged to provide information regarding at least one parameter of the battery 105 to a controller 303 of a charging point 300. For example, the temperature sensor 107 may be configured to provide a temperature signal based on a temperature of the rechargeable battery 105. The current sensor 109 may be configured to provide a current signal to the controller 103. The voltage sensor 111 may be configured to provide a voltage signal to the controller 103. The battery pack 100 may be adapted to couple with a charging port 305 of a charging point 300. The charging point 300 may comprise a controller 303 coupled to charging port 305 via an interface 313 and configured to control the charging current to the battery 105 during charging of the battery 105 based on the at least one parameter.

In the context of FIG. 6, each battery pack 100a, 100b may comprise the features of the battery packs 100 shown in FIGS. 1, 2 and 3. For example, each BMS 101a, 101b may comprise a current sensor 109, a voltage sensor 111 and/or a temperature sensor 107. The controllers 103a, 103b, or the master controller 103a, may be configured to control the charging current to each of the batteries 105a, 105b based on signals received from these sensors, as described above in relation to FIGS. 1 and 2. Each battery pack 100a, 100b may also comprise an interface 113 and each controller 103a, 103b, or the master controller 103a, may be configured to control a vehicle drive 201, as described above in relation to FIG. 3.

In some examples, the BMS 101 does not have a voltage sensor 111 or a current sensor 109. In some examples the BMS 101 does not comprise a data store.

Each battery 105 may comprise a plurality of cells 106, as described above in relation to FIG. 2. Each cell 106 may have a corresponding resistor 104 and switch 102 for controlling the current to each cell 106. In some examples, the battery 105 comprises two stacks of cells 106, for example two stacks of three cells 106. The BMS 101 may have two temperatures sensors 107, each temperature sensor 107 arranged to provide a temperature signal based on a temperature of a respective stack of cells 106. In such examples, the controller 103 may be configured to control the charging current to the battery 105 (for example to each stack and/or individual cell 106) based on the respective highest or lowest monitored temperature of the two temperature sensors 107.

In some examples, the controller 103 of the BMS 101 comprises a plurality of inputs or channels for receiving a plurality of input signals from the battery 105. The controller 103 may be configured to determine the number of cells 106 based on the input signals. For example, the controller 103 may comprise 15 channels. For example, the BMS 101 may be configured to determine the number of cells 106 based on a voltage measurement from each cell 106. The controller 103 may be configured to balance the cells 106 based on the determined number of cells 106.

The controller 103 may comprise an interface 113, 313 for communicating over a network, such as a CAN bus or a serial bus such as an RS485 bus, for example the CAN bus as described in relation to FIG. 3 or FIG. 5. The controller 103 may be configured to communicate information regarding charging and discharging of the battery 105 over the network. The controller 103 may be configured to communicate information regarding charging and discharging of the battery 105 to a charging station 300 over a network.

The controller 103 may be configured to communicate at least one of: temperature of battery, indication of level of charge of battery, charging current to battery and voltage of battery over the network.

The controller 103 may be configured to control charge or discharge of the battery 105 based on instructions received over the network. For example, in response to an instruction received over the network indicating a request to stop charging, the controller 103 may be configured to reduce the charging current to the battery 105 until the charging current is below a selected charging current threshold value, and in response transmit a message over the network indicating that the charging of the battery 105 has ended. The selected charging current threshold may, in some examples, correspond to no charging current to the battery 105.

The controller 103 may be configured to control a temperature control system to heat or cool the battery 105 based on the temperature signal. The controller 103 may be configured to activate the temperature control system to cool the battery 105 in response to the temperature exceeding a first threshold temperature, for example the first threshold temperature described above in relation to FIG. 1. The controller 103 may be configured to activate the temperature control system to heat the battery 105 in response to the temperature falling below a third threshold temperature, for example the third threshold temperature described above in relation to FIG. 1.

Although LiFePO$_4$ (lithium iron phosphate) cells have been described above, any lithium cell chemistry may be used, such as LiCoO$_2$ or LiMn$_2$O$_4$, lithium titanate, lithium suphur, lithium polymer or lithium-ion polymer. Other cell chemistries may also be used.

Other embodiments of the disclosure may relate to a BMS for use in charging and/or discharging a rechargeable battery. The BMS may be the BMS 101 described above. The BMS 101 comprises a controller 103 and two temperature sensors: (i) a first temperature sensor 107 for measuring the temperature of at least one battery cell 106 of the rechargeable battery 105, and (ii) a second temperature sensor for measuring the temperature of elements of the BMS. The controller 103 is configured to control a charging current for charging the rechargeable battery 105 based on a temperature signal from the first temperature sensor 107, and stop the flow of current to and/or from the rechargeable battery 105 in response to the second temperature sensor indicating that the temperature of elements of the BMS 101 exceed a threshold temperature.

For example, the controller 103 is configured to stop the flow of charging current to the rechargeable battery 105 in response to the second temperature sensor indicating that the temperature of elements of the BMS 101 exceed a threshold temperature. Additionally or alternatively, the controller 103 is configured to stop the flow of discharge current from the rechargeable battery 105 in response to the second temperature sensor indicating that the temperature of elements of the BMS 101 exceed a threshold temperature. Stopping the flow of charge or discharge current may comprise stopping the flow of current completely so that no current at all flows to and/or from the rechargeable battery 105.

It will be understood that the BMS may comprise any of the functionality of the BMS 101 described above. For example, the controller 103 of the BMS 101 may be configured so that in response to the temperature signal from the first temperature sensor 107 indicating that the temperature exceeds a first threshold temperature signal value, the charging current is tapered down as a function of increasing temperature.

The elements of the BMS 101 may comprise at least one voltage controlled impedance operable by the controller 103 for controlling the charging current supplied to and/or from the rechargeable battery 105. The voltage controlled impedances may comprise transistors such as insulated gate bipolar transistors, IGBTs, field effect transistors, FETs, such as junction field effect transistors, JFETS, insulated gate field effect transistors, IGFETS, metal oxide semiconductor field effect transistors, MOSFETs, and any other type of transistor.

In response to the controller 103 stopping the flow of charging and/or discharging current to and/or from the rechargeable battery 105 in response to the threshold temperature for the second temperature sensor being reached, the controller 103 may be configured to wait a set period of time before allowing the flow of current again. Additionally or alternatively, the controller 103 may be configured to wait until the second temperature sensor indicates that elements of the BMS 101 are at a temperature value lower than the threshold temperature, for example 20 degrees centigrade below the threshold temperature. For example, the controller 103 may be configured to allow the flow of current to resume when the second temperature sensor indicates that elements of the BMS 101 are below a second threshold temperature for the second temperature sensor.

The second temperature sensor may therefore have a first threshold temperature and a second threshold temperature. The first threshold temperature for the second temperature sensor may be one that, if reached, stops the flow of current to and/or from the rechargeable battery 105, and the second threshold temperature for the second temperature sensor may be one that, if reached, allows the flow of current to and/or from the rechargeable battery 105 to resume. The first threshold temperature for the second temperature sensor may be greater than the second threshold temperature for the second temperature sensor. For example, the first threshold temperature for the second temperature sensor may be 110 degrees centigrade. The second threshold temperature for the second temperature sensor may be 90 degrees centigrade.

The first and optionally second threshold temperatures for the second temperature sensor may be greater than a threshold temperature for the first temperature sensor 107. In other words, the threshold temperatures for elements of the BMS 101 may be greater than the threshold temperatures for the rechargeable battery 105. The rechargeable battery 105, and in particular the cells 106 of the rechargeable battery 105, may have a greater heat capacity than elements of the BMS 101 and may act as a heat sink for elements of the BMS 101. Providing threshold temperatures for elements of the BMS 101 that are greater than threshold temperatures for the rechargeable battery 105 may allow the controller 103 to provide a safety cut-out feature and prevent the BMS 101 and/or the battery 105 from getting too hot.

The first and optionally second threshold temperatures for the second temperature sensor may therefore be a fifth and optionally sixth threshold temperature signal value for the controller 103. The fifth and optionally sixth threshold temperature signal values may be greater than any of the first, second, third or fourth threshold temperature signal values for the first temperature sensor 107. In some examples, the BMS 101 may comprise an interface 103, for example operable to communicate over a CAN. Any of the threshold temperatures may be configurable via the interface 103, for example the threshold temperatures may be configurable via a CAN.

All the embodiments described above, and each and every claimed feature may be used in on-highway and/or off-highway applications. For example, the embodiments described above, and each and every claimed feature may be used solely in on-highway or off-highway applications. The embodiments described above and each and every claimed feature may be used in an on-highway or an off-highway electric machine, or an on-highway or an off-highway electric apparatus. For example the embodiments described above and each and every claimed feature may be used in electric or hybrid vehicles for use on-highway and/or off-highway. For example, the rechargeable battery packs 100 described herein may be used, for example in electric or hybrid vehicles for use on-highway and/or off-highway. For example, embodiments described above and each and every claimed feature may be used in automotive applications (on highway), offshore applications (off highway), in a warehouse environment (for example for use with mechanical handling equipment such as fork-lift trucks and autonomous guided vehicles, for example as described in WO 98/49075—off highway) as well as in energy storage applications (both commercial and domestic—also off highway).

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The methods and apparatus outlined herein may be implemented using controllers and/or processors which may be provided by fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

Embodiments of the disclosure provide computer program products, and computer readable media, such as tangible non-transitory media, storing instructions to program a processor to perform any one or more of the methods described herein. Other variations and modifications of the apparatus will be apparent to persons of skill in the art in the context of the present disclosure.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

It is suggested that any feature of any one of the examples disclosed herein may be combined with any selected features of any of the other examples described herein. For example, features of methods may be implemented in suitably configured hardware, and the configuration of the specific hardware described herein may be employed in methods implemented using other hardware.

The invention claimed is:

1. A battery management system for use in charging a rechargeable battery, the battery management system comprising a controller and a temperature sensor, wherein:
    the temperature sensor is configured to provide a temperature signal based on a temperature of the rechargeable battery; and
    wherein the controller is configured to control a charging current for charging the rechargeable battery based on the temperature signal, so that in response to the temperature signal indicating that the temperature exceeds a first threshold temperature signal value the charging current is tapered down as a function of increasing temperature; and balance cells of the battery if the charging current supplied to the battery exceeds a selected charging current threshold.

2. The battery management system of claim 1 wherein in response to the temperature signal indicating that the temperature exceeds a second threshold temperature, no charging current is supplied to the battery.

3. The battery management system of claim 1 further comprising a charge indicator configured to provide an indication of a level of charge of the cells of the battery, and wherein the controller is configured to balance the cells based on the indicated level of charge of each respective cell.

4. The battery management system of claim 1 wherein in response to the temperature signal indicating that the temperature is below a third threshold, the controller is configured to taper the charging current down as a function of decreasing temperature.

5. The battery management system of claim 4 wherein in response to the temperature signal indicating that the temperature is below a fourth threshold, no charging current is supplied to the battery.

6. The battery management system of claim 1 wherein the tapering of the current based on temperature is according to a stored relationship, for example a lookup table, and the controller is configured to control the charging current based on the stored relationship.

7. The battery management system of claim 3 wherein the controller is configured to balance the cells of the battery in a second mode during charging and a third mode during discharge.

8. The battery management system of claim 3 wherein the controller is configured to balance the cells in a second mode during charging in response to the charging current being supplied to the battery exceeding a selected charging current threshold, for example 0.5 A.

9. The battery management system of claim 3 wherein the controller is configured to balance the cells in a second mode during charging in response to a charging voltage being supplied to the battery exceeding a selected charging voltage threshold, for example 3.0V.

10. The battery management system of claim 3 wherein the controller is configured to balance the cells in a third mode during discharge in response to a voltage of a cell of the battery meeting and/or exceeding a selected voltage threshold.

11. The battery management system of claim 7 wherein the controller is configured to control a current drawn from each cell during the third mode during discharge.

12. The battery management system of claim 1 wherein the controller is configured to control a flow of charging current to the battery during charging of the battery so that the temperature of the battery is within a selected range.

13. A battery management system for use in charging a rechargeable battery, the battery management system comprising:
  temperature sensing means for providing a temperature signal based on a temperature of the rechargeable battery; and
  control means for controlling a charging current for charging the rechargeable battery based on the temperature signal; and balancing cells of the battery if the charging current supplied to the battery exceeds a selected charging current threshold.

14. The battery management system of claim 13 wherein in response to the temperature signal indicating that the temperature exceeds a first threshold temperature signal value the control means is configured to taper down the charging current as a function of increasing temperature; and further configured so that in response to the temperature signal indicating that the temperature exceeds a second threshold temperature, no charging current is supplied to the battery.

15. The battery management system of claim 13 further comprising charge indicating means for providing an indication of the level of charge of cells of the battery, and wherein the control means is configured to balance the cells based on the indicated level of charge of each respective cell.

* * * * *